(12) United States Patent
Roberge et al.

(10) Patent No.: US 10,427,113 B2
(45) Date of Patent: Oct. 1, 2019

(54) HORIZONTAL PRODUCT DISTRIBUTION SYSTEM USING STATIC BAFFLES IN A DISTRIBUTOR

(71) Applicant: CNH Industrial Canada, Ltd., Saskatoon (CA)

(72) Inventors: Martin J. Roberge, Saskatoon (CA); Joel Denis, Saskatoon (CA); Rex L. Ruppert, Benson, MN (US)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 15/652,755

(22) Filed: Jul. 18, 2017

(65) Prior Publication Data
US 2019/0022608 A1    Jan. 24, 2019

(51) Int. Cl.
*B65G 53/52*    (2006.01)
*B01F 5/06*    (2006.01)
(Continued)

(52) U.S. Cl.
CPC .......... *B01F 5/0606* (2013.01); *A01C 7/082* (2013.01); *A01C 7/084* (2013.01); *A01C 15/006* (2013.01);
(Continued)

(58) Field of Classification Search
CPC ...... B65G 53/528; B65G 51/14; A01C 7/082; F16L 41/023
(Continued)

(56) References Cited

U.S. PATENT DOCUMENTS 2,337,952 A * 12/1943 Whiten .................. A01C 15/02
222/505
2,703,687 A * 3/1955 Prietzel .................. B65G 51/24
104/130.01

(Continued)

FOREIGN PATENT DOCUMENTS

CN    204080127    1/2015
CN    204810952 U    12/2015
(Continued)

*Primary Examiner* — Joseph A Dillon, Jr.
(74) *Attorney, Agent, or Firm* — Rebecca L. Henkel; Rickard K. DeMille

(57) ABSTRACT

The present invention is directed to an applicator having an agricultural product mechanical and/or pneumatic conveying system which transfers particulate material from one or more source containers to application equipment on demand, and meters the material at the application equipment. The conveying system includes a static distributor interconnecting the supply lines of the conveying system with the distribution lines connected to the individual nozzles. The static distributor includes internal structures that effectively divert the incoming particulate material evenly across the interior of the static distributor such that the particulate material is evenly distributed into each of the distribution lines. The static distributor accomplishes this without the need for any moving parts or control systems/devices. In addition, damage done to the particulate material flowing through the distributor is not high, and the operation of the distributor creates a lower pressure drop across the distributor than prior art vertical distributors.

11 Claims, 6 Drawing Sheets

(51) Int. Cl.
*B65G 53/42* (2006.01)
*A01C 15/00* (2006.01)
*A01C 21/00* (2006.01)
*A01C 7/08* (2006.01)
*B01F 3/18* (2006.01)
*A01C 15/04* (2006.01)

(52) U.S. Cl.
CPC .............. *A01C 21/002* (2013.01); *B01F 3/18* (2013.01); *B01F 5/061* (2013.01); *B65G 53/42* (2013.01); *A01C 15/04* (2013.01); *B01F 2005/0631* (2013.01); *B01F 2005/0636* (2013.01)

(58) Field of Classification Search
USPC .................. 406/181; 137/561 A; 193/31 A
See application file for complete search history.

(56) References Cited

U.S. PATENT DOCUMENTS

| | | | |
|---|---|---|---|
| 2,713,509 A | 7/1955 | Lon | |
| 3,189,230 A * | 6/1965 | Gillespie | A01C 7/081 111/73 |
| 3,265,442 A * | 8/1966 | Willis, Jr. | B65G 53/528 406/181 |
| 3,544,170 A * | 12/1970 | Bowles | B01D 45/16 406/181 |
| 3,638,676 A | 2/1972 | Burch et al. | |
| 3,736,955 A * | 6/1973 | Schlesser | F15D 1/0005 137/561 A |
| 4,115,929 A | 9/1978 | Staub et al. | |
| 4,398,356 A | 8/1983 | Westelaken | |
| 4,505,297 A * | 3/1985 | Leech, III | F22B 37/227 137/561 A |
| 4,598,868 A | 7/1986 | Asaoka et al. | |
| 4,717,289 A * | 1/1988 | Popowich | B05B 1/14 111/175 |
| 5,101,847 A * | 4/1992 | Oribe | F24F 7/06 137/1 |
| 5,192,465 A | 3/1993 | Petrich et al. | |
| 5,269,465 A | 12/1993 | Zich et al. | |
| 5,758,699 A | 6/1998 | Haquet et al. | |
| 5,909,943 A | 6/1999 | Poirier et al. | |
| 5,950,694 A | 9/1999 | Jama et al. | |
| 5,979,343 A * | 11/1999 | Gregor | A01C 7/081 111/175 |
| 6,182,699 B1 * | 2/2001 | Hawkes | F16K 11/052 137/861 |
| 6,644,352 B1 * | 11/2003 | Pfetzer | B60H 1/00485 137/625.44 |
| 6,811,358 B2 * | 11/2004 | Bauver | B65G 53/528 406/113 |
| 7,125,004 B2 | 10/2006 | Dollie et al. | |
| 7,445,199 B2 | 11/2008 | Monkelbaan | |
| 8,469,636 B2 * | 6/2013 | Jost | A01C 7/082 111/174 |
| 8,544,498 B2 * | 10/2013 | Petersen | A01C 7/084 137/561 A |
| 8,656,848 B2 * | 2/2014 | Hubalek | A01C 7/084 111/175 |
| 8,887,773 B2 | 11/2014 | Cottard et al. | |
| 8,946,923 B2 | 2/2015 | Steel | |
| 10,143,129 B2 * | 12/2018 | Roberge | B65G 53/528 |
| 2001/0014258 A1 * | 8/2001 | Poncelet | A01C 7/082 406/195 |
| 2001/0047834 A1 * | 12/2001 | Menin | F16K 11/0525 137/875 |
| 2002/0158350 A1 | 10/2002 | Ender et al. | |
| 2003/0094709 A1 | 5/2003 | Zone et al. | |
| 2008/0219817 A1 | 9/2008 | Halland | |
| 2010/0276621 A1 | 11/2010 | Lee et al. | |
| 2011/0311322 A1 * | 12/2011 | Jost | A01C 7/082 406/181 |
| 2012/0237304 A1 * | 9/2012 | Zarnescu | F23K 3/00 406/181 |
| 2012/0266962 A1 * | 10/2012 | Wilson | B29C 44/385 137/1 |
| 2012/0280411 A1 | 11/2012 | Norton et al. | |
| 2014/0166110 A1 | 6/2014 | Nieuwoudt et al. | |
| 2014/0197556 A1 | 7/2014 | Cho et al. | |
| 2014/0284824 A1 | 9/2014 | Bechtel et al. | |
| 2016/0157419 A1 | 6/2016 | Henry et al. | |
| 2018/0242516 A1 * | 8/2018 | Roberge | B65G 53/528 |

FOREIGN PATENT DOCUMENTS

| | | |
|---|---|---|
| GB | 1196581 | 6/1966 |
| WO | 2015069179 | 5/2015 |

* cited by examiner

HORIZONTAL PRODUCT DISTRIBUTION SYSTEM USING STATIC BAFFLES IN A DISTRIBUTOR

FIELD OF THE DISCLOSURE

The present invention relates generally to agricultural equipment, and, more particularly, to an agricultural product delivery system on an application implement, such as a planter or fertilizer application equipment, for applying particulate material such as seed, fertilizer, herbicide or insecticide in a field, either as a surface application or deposited in the soil to improve soil quality.

BACKGROUND OF THE DISCLOSURE

Agricultural product delivery systems are known to utilize various mechanisms, including mechanical and/or pneumatic systems, i.e., a flow of air, to assist in the delivery and movement of particulate material or product such as fertilizer, seed, insecticide or herbicide from a product supply chamber through an interior passage provided by a series of elongate tubes which extend from the product supply chamber to a product applicator that places the product on or in growing medium, such as soil. Such agricultural product delivery systems are commonly employed in planters, air drills, fertilizer and pesticide applicators and a variety of other agricultural implements.

Agricultural implements that employ an agricultural product delivery system are known to have a particulate material supply source such as one or more tanks that are loaded with the particulate material or materials to be applied. The tanks have or are associated with a metering device, which typically consists of a rotating element, which meters the particulate materials from the tanks into a set of distribution channels, such as conduits, hoses, etc., for application to the farm field. In most systems, a pneumatic source such as a fan or blower provides air to convey and distribute material through the distribution channels. Once the metering of particulates is done and the mix of air and particulates is in the distribution channels, the solid concentration should remain nearly constant and in dilute phase.

Systems as described have provided certain advantages and have worked acceptably in some aspects, but are not without disadvantages, inefficiencies or inconveniences. For example, it is desirable to use a material supply source, such as a tank, with different applicator equipment by, for example, coupling the tanks with a planter for planting seed, and later coupling the same tank equipment with an applicator for applying needed pesticides and/or fertilizer.

One issue that arises with the different types of particulate material to be distributed from the system is the ability of the system to adequately distribute the particulate material of whatever types is being applied evenly through the various distribution channels and nozzles of the applicator. This problem arises due to the different types of particulate material being applied and due to operational changes including additional particulate material(s) to be dispensed and turning compensations, among others.

What is needed in the art is an agricultural product conveying system which improves efficiency and convenience of the applicator to more evenly distribute the particulate material being dispensed from the conveying system without further complicating its construction.

SUMMARY OF THE DISCLOSURE

According to one aspect of the present disclosure, an applicator includes an agricultural product conveying system which transfers particulate material from one or more source containers to application equipment on demand, and meters the material at the application equipment. The pneumatic and/or mechanical conveying system employs longitudinal tubes or conduits that operate pneumatically with a pressurized air flow and/or mechanically with mechanical devices to move and mix the particulate material from one of the source containers or tanks along the conveying system. In the conveying system, the particulate materials, if more than one is present, are blended, and is evenly distributed amongst the individual distribution lines and nozzles. The conveying system has a simplified construction and operation in comparison to prior art systems.

To evenly distribute the particulate material between the various distribution lines and nozzles, the conveying system includes a static distributor interconnecting the supply lines of the conveying system with the distribution lines connected to the individual nozzles. The static distributor includes internal structures that effectively divert the incoming particulate material evenly across the interior of the static distributor such that the particulate material is evenly distributed into each of the distribution lines. The static distributor accomplishes this without the need for any moving parts or control systems/devices, such that the operation of the static distributor greatly simplifies the construction and operation of the conveying system from prior art systems. In addition, due to the construction of the distributor, damage done to the particulate material flowing through the distributor is not high, and the operation of the distributor creates a lower pressure drop across the distributor than prior art vertical distributors.

According to another aspect of the invention, an agricultural product delivery system, includes at least one particulate material supply compartment, at least one particle delivery unit for applying particulate material from the supply compartment, a conveying system providing a flow of particulate material from the at least one particulate material supply compartment along at least one supply line to the at least one particle delivery unit and at least one static distributor connected between the at least one supply line and the at least one particulate delivery unit, wherein the static distributor does not include any moving parts According to another aspect of the invention, a static distributor for an agricultural product delivery system includes a housing having an inlet and a number of outlets spaced from the inlet and defining a flow channel therebetween with a central axis through the housing and a number of baffles disposed within the housing at angles with respect to the central axis of the housing.

According to a further aspect of the present invention, a method of delivering a number of agricultural products from a number of compartments containing the number of products to a delivering unit to apply the products in a field includes the steps of supplying the number of agricultural products from the number of particulate material supply compartments to a conveying system, mixing the agricultural product in a static distributor in the conveying system to form a mixed product, wherein the static distributor has no moving parts, conveying the mixed product to the delivering unit and applying the mixed product from the delivering unit onto an agricultural field.

Numerous additional objects, aspects and advantages of the present invention will be made apparent from the following detailed description taken together with the drawing figures.

BRIEF DESCRIPTION OF THE DRAWINGS

The drawings illustrate the best mode of practicing the present disclosure.

DETAILED DESCRIPTION OF THE DISCLOSURE

Figure 1:
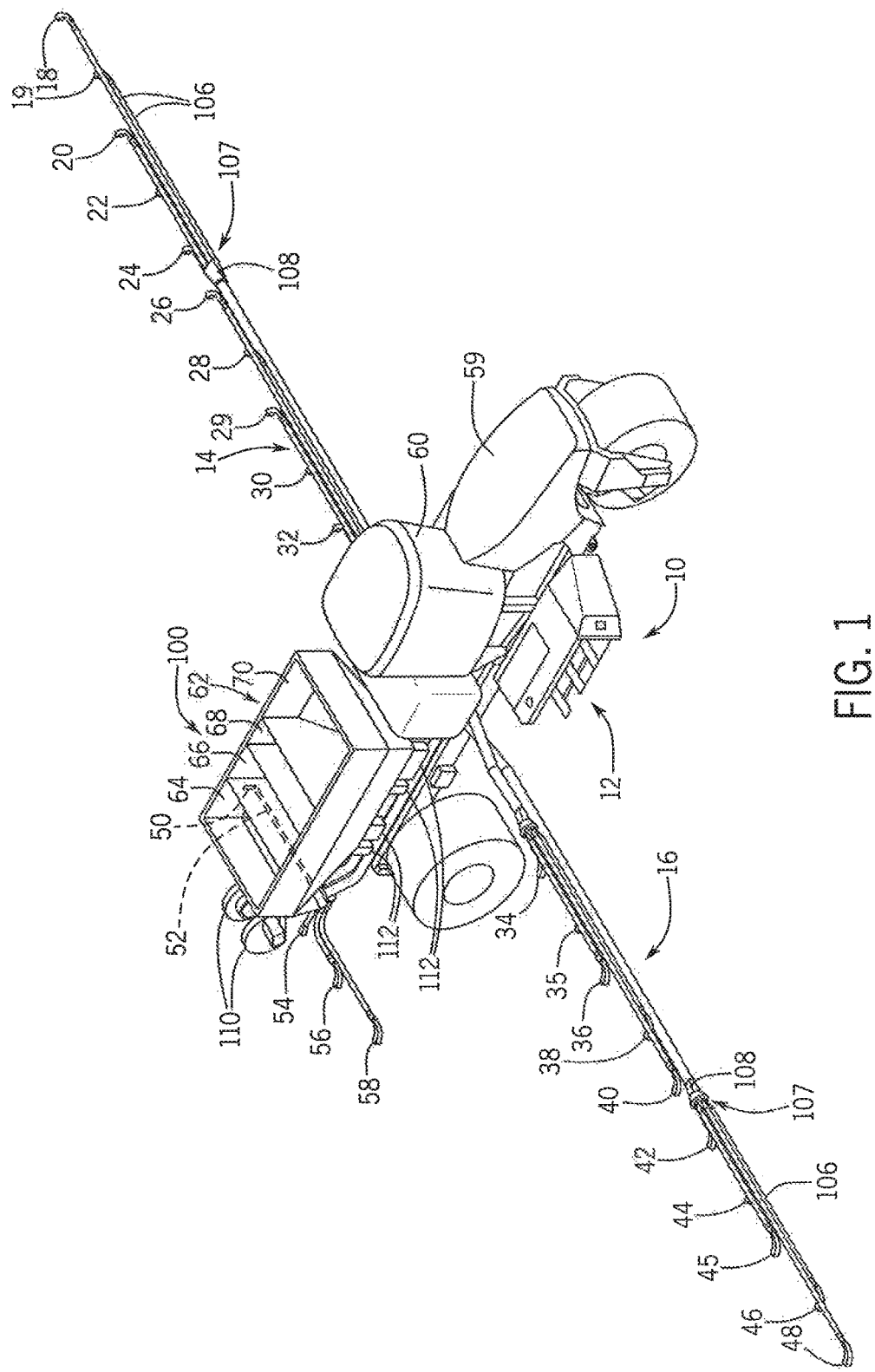
FIG. 1 is an isometric view of an agricultural application implement, in the nature of a fertilizer spreader, having a conveying system according to one exemplary embodiment of the invention.
Figure 2:
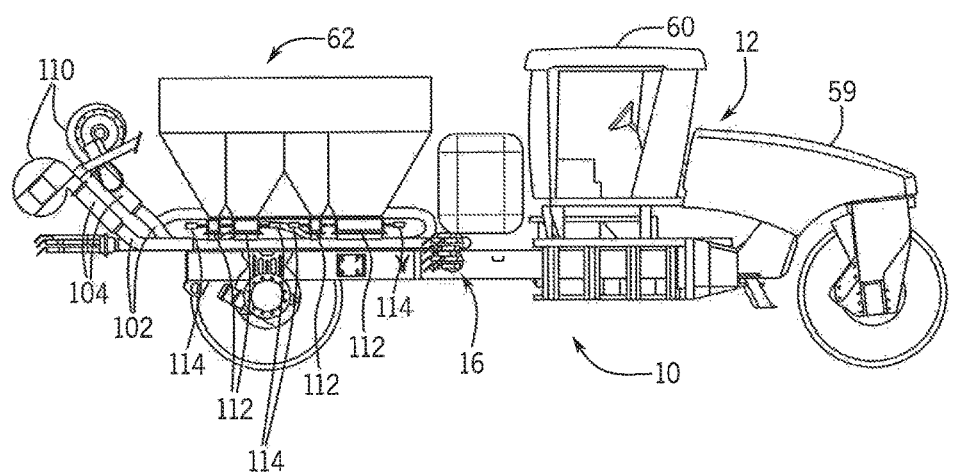
FIG. 2 is a side elevation view of the fertilizer spreader shown in FIG. 1
Figure 3:
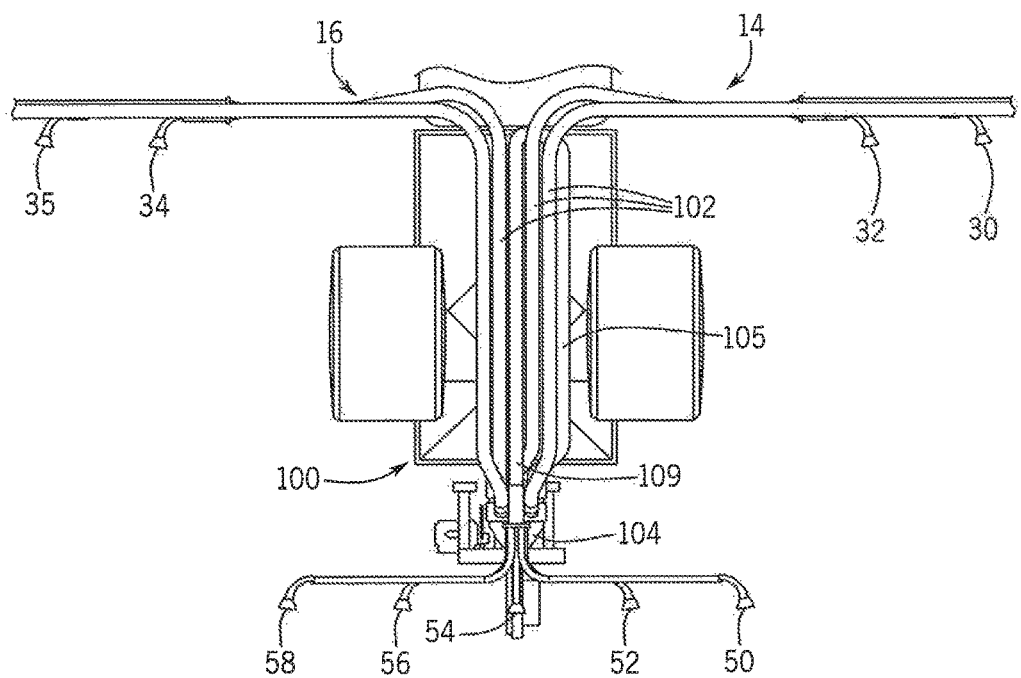
FIG. 3 is bottom plan view of the conveying system according another exemplary embodiment of the invention.

Referring now to the drawings, and more particularly to FIGS. 1-3, there is shown an agricultural application implement 10, on which a pneumatic conveying system 100 can be used. In the exemplary embodiment shown, application implement 10 is a granular fertilizer applicator 10. As is known in the art, applicator 10 generally includes a large tired transport unit 12 such as truck or tractor, and laterally extending particle delivery booms 14 and 16, which may be pivoted to a stowed position close to the implement for storage or transport. Each boom 14, 16 includes a plurality of boom tubes or conduits terminating at the outboard end in a particle delivering unit, which for fertilizer applicator 10 are a spreading outlet or nozzle. In the exemplary embodiment shown, boom 14 can include from eight to sixteen, and in the illustrated exemplary embodiment includes ten nozzles 18, 19, 20, 22, 24, 26, 28, 29, 30 and 32; and boom 16 can include from eight to sixteen, and in the illustrated exemplary embodiment includes ten nozzles 34, 35, 36, 38, 40, 42, 44, 45, 46 and 48. Additionally, at the back of applicator 10 there are between four to six and in the illustrated exemplary embodiment, five rear nozzles 50, 52, 54, 56 and 58 to provide full and complete coverage across the width of implement 10, include the area between the inboard-most nozzles 32 and 34 of booms 14, 16. Implement transport unit 12 is self-propelled by an engine in an engine compartment 59 and includes an operator cab 60. In the exemplary embodiment shown, an uncovered tank 62 includes compartments 66 and 70 for carrying particulate material to be distributed to and disbursed by nozzles 18-58. Further smaller compartments 64, 68 can be provided to supply micro-nutrients or other materials to nozzles 18-58. The supply of particulate in compartments 64, 66, 68, 70 is replenished periodically from a still larger volume supply vehicle (not shown).

Fertilizer applicator 10 is illustrative of the types of equipment for which the conveying system 100 can be used; however, it should be understood that the conveying system 100 may, of course, be employed in conjunction with other agricultural equipment such as tillage, seeding or planting devices, and is useful in distributing particulate material other than fertilizer.

Looking now at FIGS. 1-3, in the illustrated exemplary embodiment the compartments 64-70 of the tank 62 are each disposed directly above the conveying system or assembly 100, which is a pneumatic conveying system 100. The system 100 includes five large diameter supply lines 102, which in certain exemplary embodiments are between 3"-10" in diameter, and in other exemplary embodiments are between 4.5"-5" in diameter, that extend from a plenum 104 at one end, under the compartments 64-70 and terminate at the booms 14, 16 or at the rear nozzles 50-58. At the booms 14, 16, the supply lines 102 and the particulate material or product transported therein can be split by a suitable distribution structure or mechanism 107, such as a static distributor(s) 108, among or into a number of secondary or smaller distribution lines 106, which in certain exemplary embodiments are between 1.5"-4" in diameter, and in other exemplary embodiments are between 2.5"-3" in diameter, that are connected to the nozzles 18-58 opposite the distributor 108.

To collect and drive the particulate material along the lines 102, in the illustrated embodiment one or more fans 110 are operably connected to the plenum 104 opposite the lines 102. The air flow from the fans 110 is directed from the fans 110 through the plenum 104 and into the respective lines 102 as a result of the structure of the plenum 104. After the air flow passes through the one or more plenums 104 connected to the one or more fans 110 and collects/entrains the particulate material from the compartments 64-70 in a manner to be described, the air flow continues to flow along each of the four (4) large diameter lines 102 that make approximately a 90° turn to connect to the booms 14, 16.

In order to spread the particulate material/product over/onto the center section over which the machine 10 passes, a large line 102 must move product to the rear nozzles 50-58 where there is no interference by the machine 10 on the spread pattern. To accomplish this a line 102 carrying only air is added on the side of the machine 10 and has a forward section 105 that extends from the plenum 104 to the front of the machine 10. At the front of the machine 10, one particular line 102 turns 180° and has a rearward section 109 that passes beneath the compartments 64-70 where the line 102 collects the particulate material/product and transports the product to the nozzles 50-58 at the rear of the machine 10.

In an alternative exemplary embodiment, it is contemplated that the conveying system 100 can be formed, optionally in conjunction with the pneumatic conveying system, with one or more mechanical conveyors (not shown) take the form of one or more augers (not shown) that are disposed within the lines 102 and encircle the auger(s) along their length. The augers are each operably connected to a motor (not shown) that causes the augers to rotate within the respective lines 102, moving the particulate material in conjunction with the air flow through the lines 102. The operation of the motor can be controlled to control the speed of rotation of the augers, either collectively or independently from one another, such that the speed of the conveying system 100 can be varied as desired but not to meter the product(s).

Figure 4:
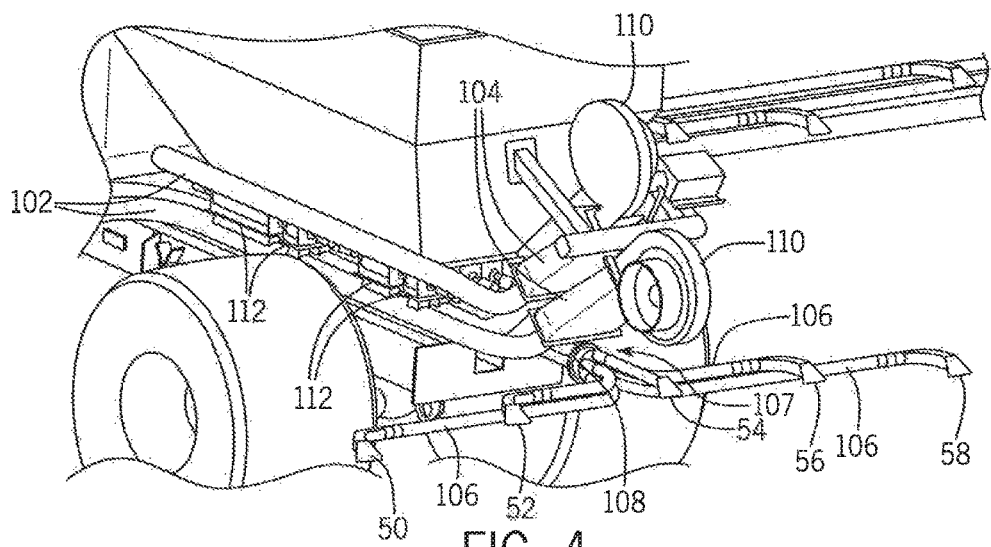
FIG. 4 is an isometric view of a conveying system on a fertilizer spreader according to another exemplary embodiment of the invention.
Figure 5:
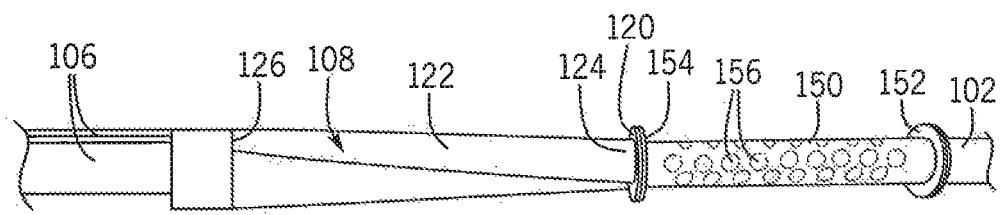
FIG. 5 is an isometric view of a static distributor connected between a supply line and a distribution line of the conveying system of FIG. 3.
Figure 6:
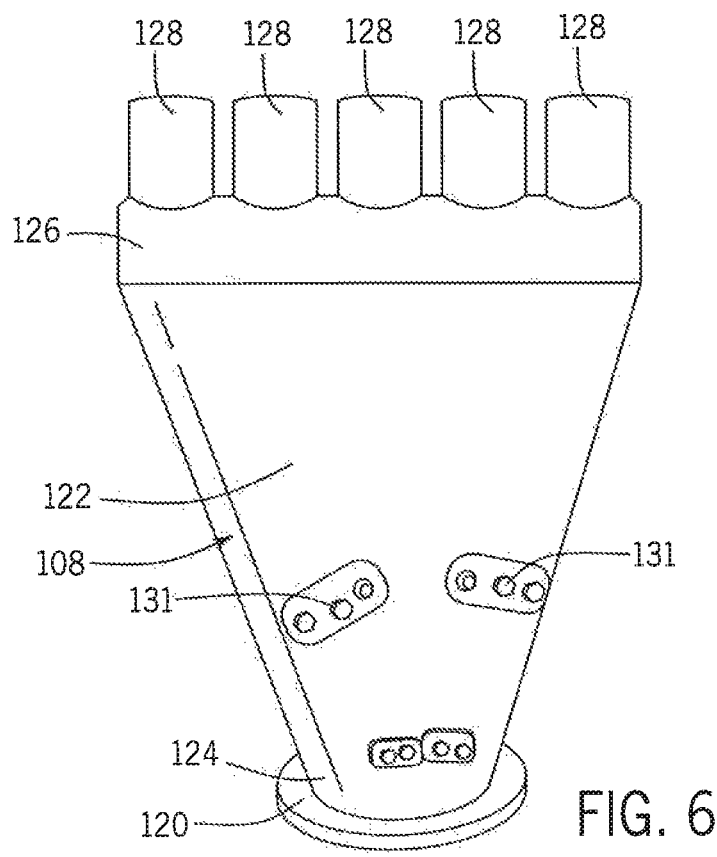
FIG. 6 is a top plan view of the static distributor of FIG. 5.
Figure 7:
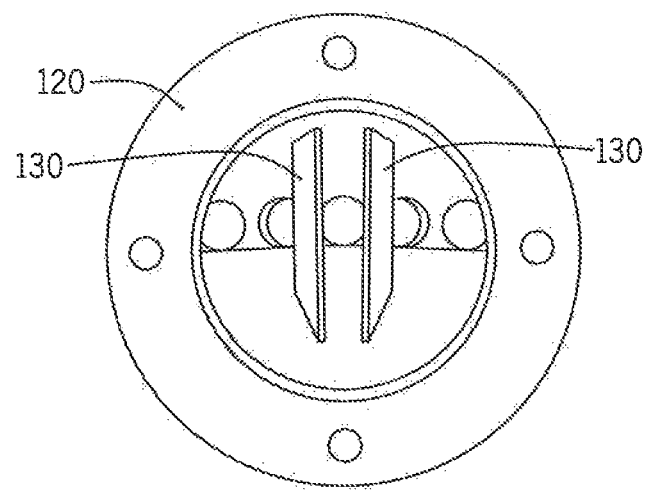
FIG. 7 is an inlet end elevation view of the static distributor of FIG. 6.

Looking now at FIGS. 1, 2 and 4, in the illustrated exemplary embodiment the plenums 104 provide airflow from the fans 110 to all five lines 102 of the system 100, with one plenum 104 connected to the two (2) outside lines 102, with the other plenum 104 supplying the air flow to the center three (3) lines 102. The lines 102 are split in this fashion because of the higher pressure drop associated with the outermost lines 102 as a result of their length. With only the two higher pressure lines supplied by one plenum 104, it allows the fan 110 connected to the longer lines 102 to supply a higher pressure airflow through these lines 102 since less airflow is required for two lines 102 vs three lines 102. In the illustrated exemplary embodiment, the two fans 110 and associated plenums 104 are stacked vertically with respect to one another. However a different configuration can be utilized where the fans 110 and plenums 104 are arranged in the same horizontal plane in order to minimize the space requirements, with the plenums 104 also optionally being rotated 90° from the illustrated configuration.

Figure 8:
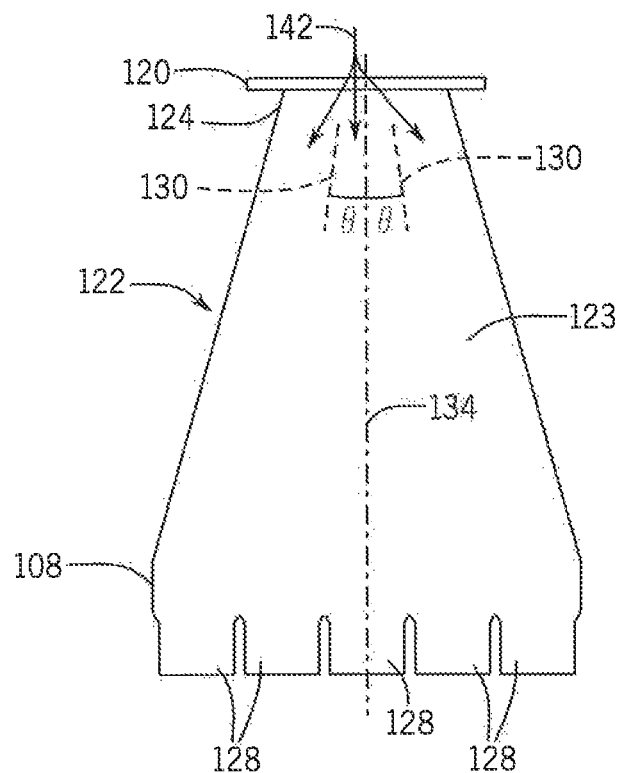
FIG. 8 is a cross-sectional view of the static distributor of FIG. 6.
Figure 9:
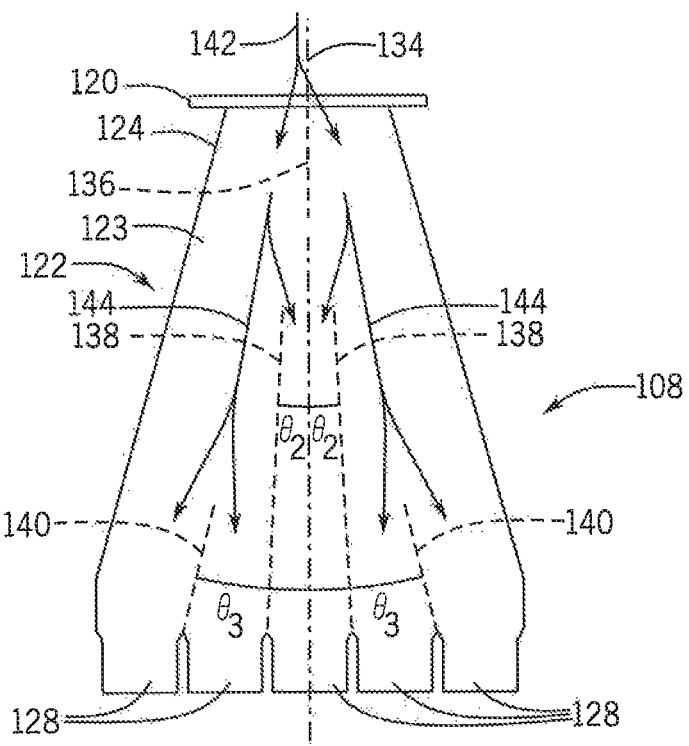
FIG. 9 is a cross-sectional view of a static distributor according to another exemplary embodiment of the invention.

The particulate material/product contained within each of the compartments 64-70 of the tank 62 is introduced into the airflow in the various lines 102 via an airtight inline product metering system 111, that is formed of a number of metering devices 112 driven by motors 114 that function to meter the product flowing from the compartments 64-70 into each line 102.

Referring now to FIGS. 5-8, in the illustrated exemplary embodiment, a static distributor 108 is connected between each supply line 102 and the associated distribution lines 106, and is constructed to not include any parts that move during operation of the distributor 108. The configuration of the static distributor 108 is generally planar such that the distributor 108 places all the distribution lines 106 on the same horizontal plane in the same axis as the flow of particulate material from the supply line 102. The distributor 108 includes an inlet 120 connected to the supply line 102, a housing 122 that extends from a narrow end 124 at the inlet 120 to a wide end 126 opposite the inlet 120 and a number of separate outlets 128 connected to and extending outwardly from the housing 122 at the wide end 126. The housing 122 defines a flow channel 123 from narrow end 124 to the wide end 126. The inlet 120 has a diameter approximately equal to that of the supply 102, and the outlets 128 each have diameters approximately equal to that of the distribution lines 106 in order to enable the outlets 128 to be connected to each of the distribution lines 106 in a known manner.

Looking in particular at the illustrated exemplary embodiments of FIGS. 7 and 8, the housing 122 includes a number of baffles 130 disposed therein within the flow channel 123 defined by the housing 122. The baffles 130 can be connected to the housing 122 in any suitable manner, such as by welding or by suitable fasteners 131, to extend across the interior 132 of the housing 122 thereby enabling the baffles 130 to deflect the incoming particulate material from the inlet 120. The baffles 130 can have any desired configuration and angular orientation relative to the housing 122, and in the illustrated embodiment are shown to be disposed vertically within and across the interior 132 of the housing 122, with the baffles 130 disposed at an angle $\theta$ with regard to the central axis 134 of the housing 122 extending between the narrow end 124 and the wide end 126. This configuration for the baffles 130 directs the incoming flow of particulate material across the interior 132 of the housing 122 to more evenly distribute the particulate material into each of the outlets 128.

In an alternative exemplary embodiment of the housing 122 shown in FIG. 9, additional baffles 136-140 are disposed within the housing 122 to separate particulate material flow higher up and into each of the five (5) outlets 128 compared to the double baffles 130 illustrated in FIG. 8. The first or separating baffle 136 extends into the interior 132 of the housing from the narrow end 124 or inlet 120, optionally along the central axis 134, and is used to initially divide the particulate material flow 142 entering the inlet 120 into two even streams 144. The second baffles 138 extend inwardly from between adjacent outlets 128 and are spaced apart from one another at an angle $\theta_2$ with regard to the central axis 134. The second baffles 138 separate approximately twenty percent (20%) of each of streams 144 forming one-fifth of the entire incoming particulate material flow 142, to the central axis 134 between baffles 138 while diverting the remainder of the streams 144 outside of the baffles 138. The remaining particulate material in each of the two streams 144 is approximately divided in half by the baffles 140 that extend inwardly from adjacent outlets 128 and are spaced from the baffles 138 at an angle $\theta_3$ relative to the central axis 134 that is different than that of the baffles 138, resulting in approximately twenty percent (20%) of the total incoming particulate material 142 being directed by the distributor 108 into every outlet 128 and associated distribution line 106.

This design of the distributor 108 in FIG. 9 has more wear items. i.e., extra baffles 136-140 and a compounding error, in that any error in the first split of the incoming particulate material flow 142 by baffle 136 is carried thorough to all subsequent streams 144. However, the static distributor 108 can achieve a better distribution of the particulate material flow 142 with different line resistances. i.e., from the different lengths of distribution lines 106. The static distributor 108 in any embodiment can accommodate more or less distribution lines 106 by changing the width and baffle position and angle(s) in order to maintain a desired distribution across each of the outlets 128 to the distribution lines 106.

In addition, different particulate materials/products and different flow rates of those materials/products may change the distribution across the outlets 128 regardless of the configuration of the baffles 130, 136-140. For example, lighter particulate materials/products, and/or lower throughputs/flow rates tend to stay suspended in the airstream within the supply lines 102, whereas heavier particulate materials/products and higher throughputs/flow rates tend to remain on the bottom of the supply lines 102.

To address the issue with heavier materials and/or lower flow rates, as best shown in the exemplary illustrated embodiment of FIG. 5, a dimple tube 150 can be disposed immediately upstream of the inlet 120 for the distributor 108. The configuration of the dimple tube 150 is generally cylindrical in shape and includes and inlet end 152 connected to the supply line 102 and an outlet end 154 connected to the inlet 120 of the distributor 108. Between the inlet end 152 and the outlet end 154 the dimple tube 150 includes a number of inwardly extending projections or dimples 156 disposed on or formed integrally with an interior surface (not shown) of the tube 150. The incoming particulate material flow 142 contacts one or more of the dimples 156 within the tube 150 and is thus deflected inwardly toward the central axis of the tube 150, thereby randomizing the particulate material product flow 142 prior to entering the static distributor 108 and reducing any negative effects of higher throughput and increased particulate material/product weight or density.

In other exemplary embodiments, the pattern or configuration of the dimples 156 within the dimple tube 150 and/or the length of the tube 150 can be changed in order to accommodate space constraints and improve the randomization of the particulate material flow 142 through the tube 150.

In addition to the use of the dimple tube 150, within the distributor 108 the angles, spread, and length of the baffles 130, 136-140 can be changed in order to improve the distribution to each of the outlets 128. For example, increasing the angle of the baffles 130, 136-140 relative to the central axis 134 of the housing 122, the resulting direction of the particulate material flow 142 increases throughput to the outermost outlets 128. Conversely, increasing the spread or distance between baffles 130 of the exemplary embodiment of FIG. 8, or the baffles 138 of the exemplary embodiment of FIG. 9, increases throughput along the central axis 134 to the center outlets 128. Also, in another exemplary embodiment, the baffles 130, 136-140 can be configured to be laterally adjustable and/or pivotable with regard to the housing 122 in order to enable the configuration of the baffles 130, 136-140 within a single distributor 108 to be altered for different throughput and/or particulate material/product weight or density, as well as to adjust the throughput of the distributor 108 towards or away from the central outlets 128, as desired.

Figure 10:
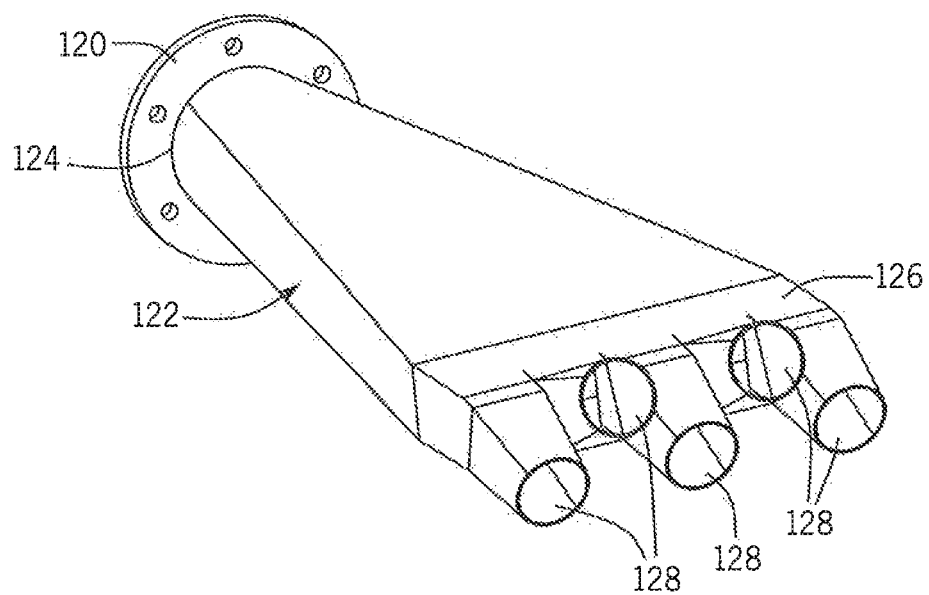
FIG. 10 is an isometric view of a static distributor according to another exemplary embodiment of the invention.

Referring now to the exemplary embodiment illustrated in FIG. 10, the orientation of the outlets 128 on the housing 122 can be altered. In this configuration, the outlets 128 can extend outwardly from the housing 122 at an angle with regard to one another and with regard to the central axis 134. Such that some of the outlets 128 are angled upwardly with regard to the housing 122 and other outlets 128 can be angled downwardly with regard to the housing 122. In the exemplary embodiment of FIG. 10, the outlets 128 are alternately angled upwardly and downwardly which provides the housing 122 with a staggered arrangement for the outlets 128 that enables the distribution lines 106 to be connected closer to one another, resulting in a narrower profile for the distributor 108.

While the conveying system 100 including the static distributor 108 disclosed so far herein have been primarily with respect to pneumatic and/or mechanical fertilizer application equipment or applicator commonly referred to as a "floater", it should be understood that the advantages from the conveying system 100 including the static distributor 108 disclosed herein can be obtained on other types of equipment for applying particulate materials in a field. Planters of various types are known to include an applicator unit, such as a drill or seeder, and may include an air cart having one or more bulk tanks carrying fertilizer and/or seeds to be planted. The conveying system 100 including the static distributor 108 disclosed herein can be provided on the planter, and one or more air/seed inductors on the air cart. If the air cart is then used with a planter of a different type, or with another type of particle application equipment, adjustments to the conveying system 100 including the static distributor 108 can be made without the need to adjust the air/seed inductor assembly on the air cart. Accordingly, switching from one crop to another crop or from one planter to another planter does not require major adjustment of the air seed inductor assembly on the air cart.

In using a conveying system 100 as disclosed herein, a variety of materials can be applied by a variety of different implements. The particulate material to be applied is contained in one or more compartments. The particulate material or materials are supplied from the tanks to the conveying system 100 wherein the material or materials are conveyed to one or more particle injectors while being intermixed with one another. At the particle injector the conveyed product or products are provided in a metered flow and transferred to one or more particle delivery unit, which can be a broadcast spreader, seeder for depositing seeds or other materials across the surface of soil, a row opener unit for depositing seeds or other material in rows, or the like.

Various other alternatives are contemplated as being within the scope of the following claims particularly pointing out and distinctly claiming the subject matter regarded as the invention.

We claim:

1. An agricultural product delivery system, comprising:
   at least one particulate material supply compartment;
   at least two particle delivery units configured to apply particulate material received from the at least one particulate material supply compartment;
   a conveying system having at least one supply line with a first end operatively connected to the at least one particulate material supply compartment and a second end, the conveying system configured to provide a flow of particulate material from the at least one particulate material supply compartment along the at least one supply line to the at least two particle delivery units; and
   at least one static distributor having a first end operatively connected to the second end of the at least one supply line and a second end operatively connected to the at least two particulate delivery unit, the at least one static distributor including:
      a housing having an inlet, a number of outlets spaced from the inlet and first and second paced walls defining a flow channel therebetween with a central axis through the housing; and
      a pair of diverging panels disposed within the housing and extending between the spaced walls, the pair of diverging panels defining baffles having a first end directed toward the first end of the at least one static distributor and a second end directed toward the second end of the at least one static distributor;
   wherein:
      the first end of the baffles being narrower than the second end of the baffles.

2. The agricultural product delivery system of claim 1, wherein the baffles are adjustable with respect to the housing.

3. The agricultural product delivery system of claim 1, wherein the baffles extend across an interior of the housing.

4. The agricultural product delivery system of claim 1, wherein the baffles comprise:
   a first pair of baffles disposed within the housing at a first angle with respect to the central axis; and
   a second pair of baffles spaced from the first pair of baffles and disposed at a second angle with respect to the central axis.

5. The agricultural product delivery system of claim 4, wherein each of the first pair of baffles and the second pair of baffles extend into the housing from between adjacent outlets.

6. The agricultural product delivery system of claim 5, further comprising a separating baffle spaced from the first pair of baffles and the second pair of baffles.

7. The agricultural product delivery system of claim 6, wherein the separating baffle extends inwardly from the inlet of the housing.

8. The agricultural product delivery system of claim 7, wherein the discharge channel includes one or more baffles therein.

9. The agricultural product delivery system of claim 1, wherein the number of outlets extend outward from the housing at angles with regard to the central axis of the housing.

10. The agricultural product delivery system of claim 9, wherein the number of outlets extend outward from the housing at angles with regard to one another.

11. The agricultural product delivery system of claim 1 further comprising a dimple tube connected to the inlet of the housing.

* * * * *